(12) United States Patent
Suzuki

(10) Patent No.: US 6,302,174 B1
(45) Date of Patent: Oct. 16, 2001

(54) PNEUMATIC TIRE

(75) Inventor: Toshiaki Suzuki, Ashiya (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/290,874

(22) Filed: Apr. 14, 1999

(30) Foreign Application Priority Data

Apr. 17, 1998 (JP) .................................................. 10-107881

(51) Int. Cl.⁷ .......................... B60C 11/03; B60C 101/02; B60C 115/00
(52) U.S. Cl. ................................ 152/209.15; 152/209.26; 152/209.28
(58) Field of Search ........................ 152/209.15, 209.26, 152/209.28; D12/142, 144, 146, 147, 148

(56) References Cited

U.S. PATENT DOCUMENTS

| | | | |
|---|---|---|---|
| D. 387,023 | * | 12/1997 | Sato et al. ............................ D12/147 |
| D. 395,857 | * | 7/1998 | Yamakage ............................ D12/147 |
| D. 427,953 | * | 7/2000 | Murata ................................. D12/147 |
| 4,258,691 | * | 3/1981 | Nakayama ....................... 152/209.15 |
| 5,109,903 | * | 5/1992 | Watanabe et al. .............. 152/209.15 |
| 5,370,168 | * | 12/1994 | Boiocchi et al. ............... 152/209.28 |
| 5,421,391 | * | 6/1995 | Himura ........................... 152/209.28 |
| 5,423,364 | * | 6/1995 | Himuro ........................... 152/209.28 |
| 5,450,885 | * | 9/1995 | Hanya ............................. 152/209.26 |
| 5,472,030 | * | 12/1995 | Shibata et al. .................. 152/209.26 |
| 6,076,579 | * | 6/2000 | Matsumoto ..................... 152/209.15 |

FOREIGN PATENT DOCUMENTS

| | | | | |
|---|---|---|---|---|
| 602989 | * | 6/1994 | (EP) | ................................ 152/209.15 |
| 875403 | * | 11/1998 | (EP) | . |
| 56-79007 | * | 6/1981 | (JP) | . |
| 2-182505 | * | 7/1990 | (JP) | ................................ 152/209.15 |
| 3-139402 | * | 6/1991 | (JP) | . |
| 3-246104 | * | 11/1991 | (JP) | ................................ 152/209.15 |
| 5-278408 | * | 10/1993 | (JP) | ................................ 152/209.26 |
| 6143932 | | 5/1994 | (JP) | . |
| 6143937 | | 5/1994 | (JP) | . |
| 6191227 | | 7/1994 | (JP) | . |
| 7101205 | | 4/1995 | (JP) | . |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire is provided in the tread center region with a wide main groove extending continuously in the tire circumferential direction, the main groove divides the tread into two lateral parts, each of the lateral parts is provided with no groove extending continuously in the tire circumferential direction, the main groove has a groove width of not less than 35 mm, the main groove has zigzag edges each having a zigzag amplitude of not more than 0.4 times the groove width, and parts of the zigzag edges which are defined as protruding towards the center line of the main groove are rounded by an arc, and the radius of curvature of the arc is in the range of from 2 to 15 mm when measured in the tire meridian section at the peak of the protruding part.

16 Claims, 6 Drawing Sheets

PNEUMATIC TIRE

FIELD OF INVENTION

The present invention relates to a pneumatic tire, more particularly to a tread portion being capable of improving steering stability while maintaining the noise performance and wet performance.

BACKGROUND OF INVENTION

Pneumatic tires, which are provided in the tread center region with a wide circumferential groove to improve wet performance and so called air-column-resonance noise, are disclosed in the laid-open Japanese patent applications JP-A-6-143932, JP-A-6-143937, JP-A-6-191227 and JP-A-7-101205 for example.

In such tires, however, when the steering wheel is turned during high speed running by a small angle of less than 10 degrees for example, the steering stability tends to be not good. Especially steering response is apt to be light although a steady response is preferred.

SUMMARY OF INVENTION

It is therefore an object of the present invention to provide a pneumatic tire in which steering stability, such as response at a relatively small steering angle, is improved without deteriorating the wet grip performance and noise performance improved by a wide circumferential groove.

According to the present invention, a pneumatic tire is provided in the tread center region with a wide main groove extending continuously in the tire circumferential direction, the main groove divides the tread into two lateral parts, each of the lateral parts is provided with no groove extending continuously in the tire circumferential direction, the main groove has a groove width of not less than 35 mm, the main groove has zigzag edges each having a zigzag amplitude of not more than 0.4 times the groove width, and parts of the zigzag edges which are defined as protruding towards the center line of the main groove are rounded by an arc, and the radius of curvature of the arc is in the range of from 2 to 15 mm when measured in the tire meridian section at the peak of the protruding part.

Embodiments of the present invention will now be described in detail in conjunction with the accompanying drawings.

BRIEF DESCRIPTIONS OF THE DRAWINGS

DETAILED DESCRIPTION OF THE INVENTION

Figure 1:
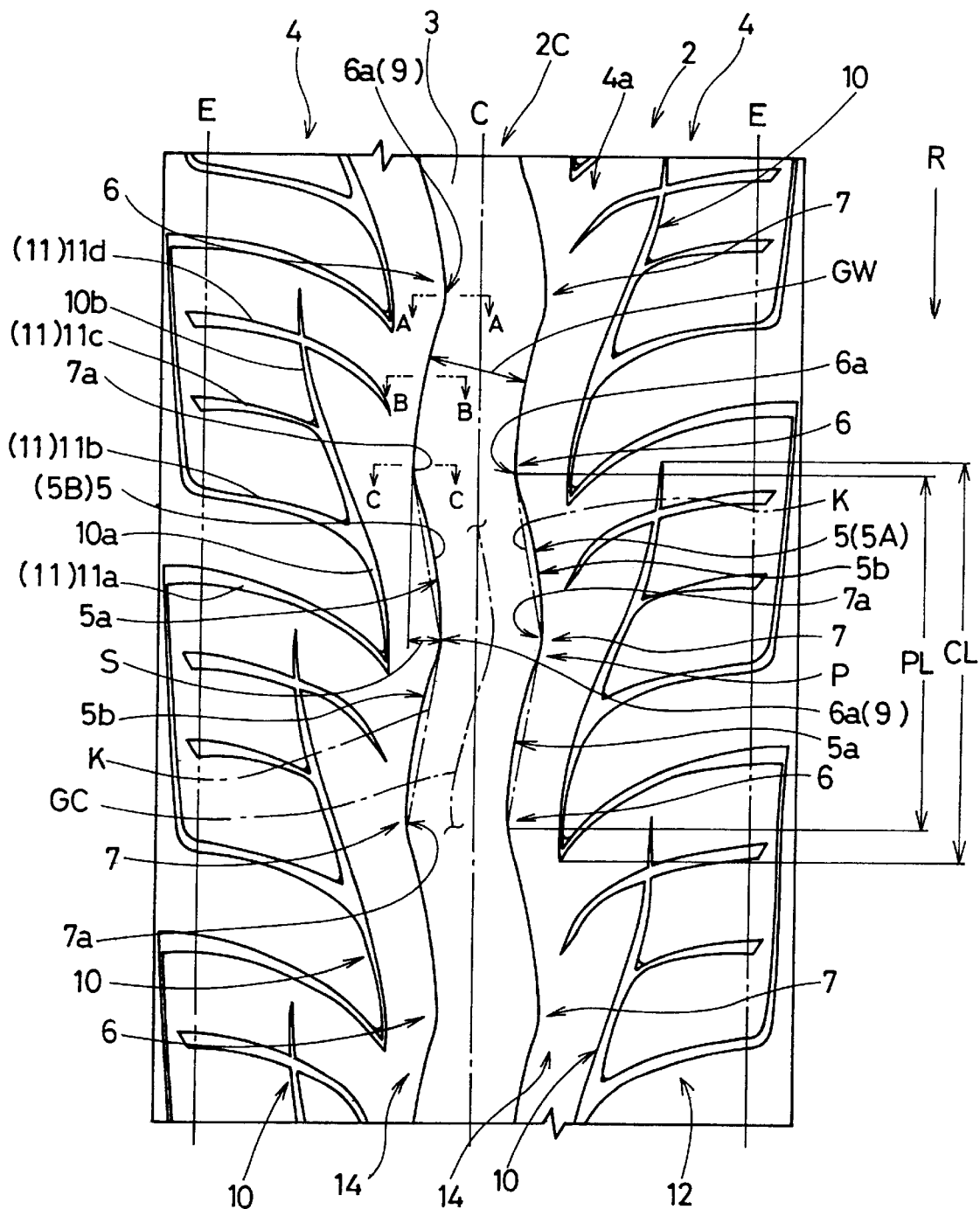
FIG. 1 is a plan view of an embodiment of the present invention.

The present invention can be suitably applied to wide-tread radial tires having a relatively low aspect ratio (tire section height/tire section width) of 0.4 to 0.6. The following embodiments are radial tires for passenger cars.

The radial tire comprises a tread portion 2, a pair of axially spaced bead portions, and a pair of sidewall portions extending between the tread edges and the bead portions. And, usually, the tire is reinforced by a bead core disposed in each bead portion, at least one radial carcass ply extending between the bead portions, and a belt disposed radially outside the carcass in the tread portion 2.

The tread portion 2 is provided in the center thereof with a zigzag main groove 3 extending continuously in the circumferential direction to divide the tread portion 2 into two lateral parts 4.

In the tread portion 2, in order to prevent the rigidity of the tread portion from decreasing, there is no circumferentially-continuous groove other than the main groove 3.

The main groove 3 has a groove width GW of not less than 35 mm, preferably 35 to 75 mm, more preferably 35 to 70 mm, still more preferably 40 to 60 mm. The groove depth thereof is not less than 5 mm, preferably not less than 6 mm (in this embodiment 8.5 mm).

As the edges of the main groove 3 are zigzag, each edge 5 has alternate protruding parts 6 and recessing parts 7, wherein the protruding parts 6 are defined as swelling towards the center line GC of the main groove 3, and accordingly the recessing parts 7 are defined as swelling towards the reverse direction or the tread edge E.

The zigzag of each edge 5 of the main groove 3 has the amplitude S of not more than 0.4 times, preferably 0.1 to 0.4 times, more preferably 0.2 to 0.4 times the groove width GW.

Therefore, the increased groove width can decrease the air flow speed, and the zigzag profile is able to change the resonance mode. Thus, the air-column-resonance sound is reduced while also improving the wet grip performance. By defining the zigzag amplitude in relation to the main groove width, it is possible to reduce the resonance sound and a pitch noise while maintaining the improved wet grip performance. Here, the pitch noise is such a noise that is generated when the road surface is hit by the zigzag-peak portions 6a during running.

If the main groove 3 is a straight groove, air tube resonance is liable to occur, and the rigidity of the tread central region relatively decreases. Thus, it is not preferable for improving the steering stability. If the zigzag amplitude S is large, it is effective for controlling the air tube resonance sound because the air flow in the main groove 3 is further disturbed. However, the overall noise is liable to increase as the pitch noise component increases. By setting the amplitude S as above, both the resonance noise and pitch noise can be reduced.

Here, the amplitude S is, as shown in FIG. 1, defined as the axial distance between the deepest point 7a of the recessing part 7 and a nominal peak 6v of the protruding part 6 because the edge 5 is rounded. The nominal peak 6v is, as shown in FIG. 2A, defined as an intersecting point between the tread surface line 4a and the groove sidewall line 3a.

Figure 2A:
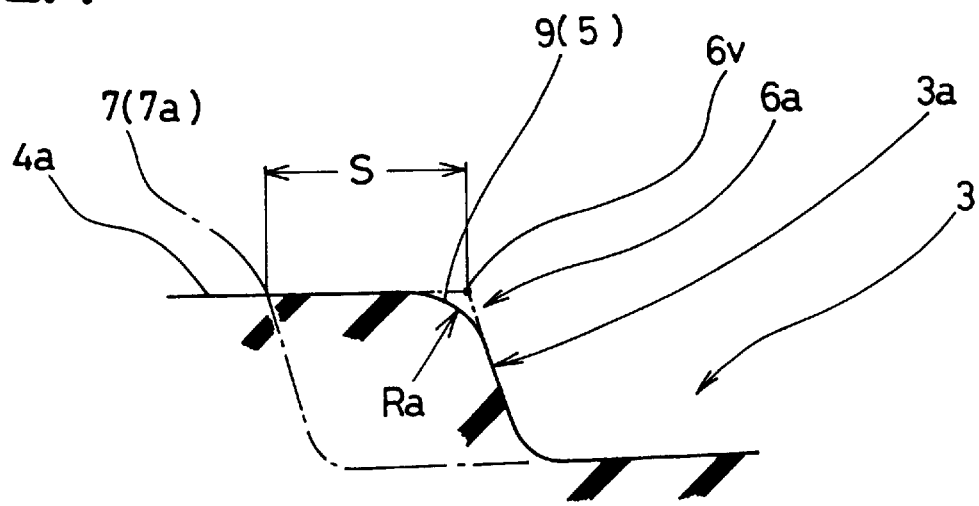
FIG. 2A is a cross sectional view taken along line A—A of FIG. 1.

In a meridian section at the peak 6a of the protruding part 6 of the groove edge 5, the groove edge 5 is rounded by an arc having a radius of curvature Ra of 2 to 15 mm, preferably, 3 to 13 mm, as shown in FIG. 2A. By forming the rounded part 9, steering stability can be improved. Especially, when small steering angles are applied at a high speed, a steady steering response can be obtained. Further, the pitch noise can be greatly reduced. If the rounded part 9 is not formed, a steady steering response is lost, and the pitch noise increases. If the radius Ra is less than 2 mm, it is difficult to reduce the pitch noise. If the radius Ra is more than 15 mm, the rigidity of the tread central region 2C decreases and the ground contacting region is liable to decrease. As a result, the steering stability has a tendency to deteriorate.

Figure 2B:
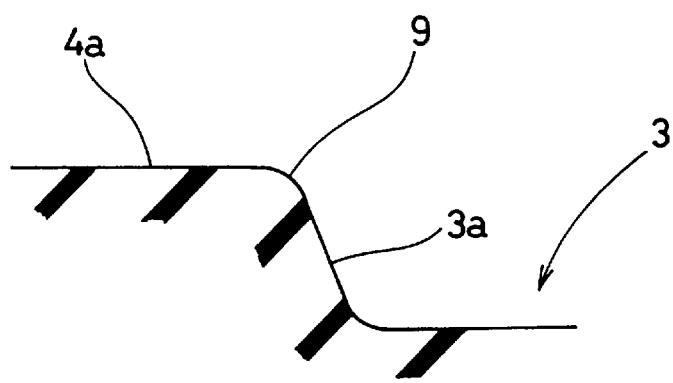
FIG. 2B is a cross sectional view taken along line B—B of FIG. 1.
Figure 2C:
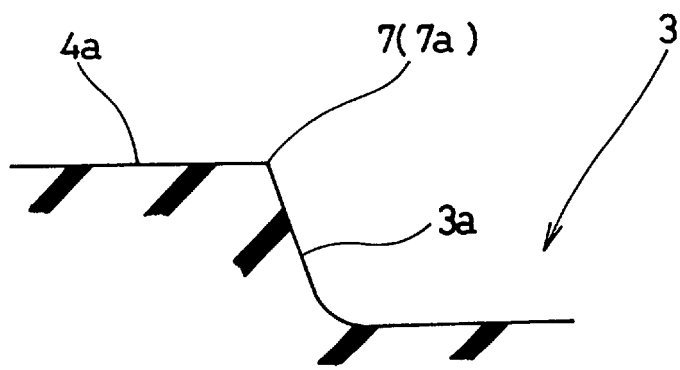
FIG. 2C is a cross sectional view taken along line C—C of FIG. 1.

In this example, as shown in FIG. 2B and FIG. 2C, in the portion of the groove edge 5 other than the peak 6a of the protruding part 6, the radius of curvature Ra gradually decreases from each protruding part 6 towards the recessing parts 7 on both sides thereof, and the radius Ra becomes substantially zero at the deepest point 7a of the recessing part 7 to have a sharp groove edge. However, it may be possible to provide such a rounded part 9 only in the immediate neighborhood of each of the peaks 6a.

Each of the groove edges 5A and 5B is composed of alternate first curved parts 5a and second curved parts 5b, each part 5a and 5b is defined as extending between the adjacent peak 6a and deepest point 7a.

Each of the first curved parts 5a swells towards the center line GC of the main groove 3 and is located on the inside of a straight line K drawn between the peak 6a and deepest point 7a.

Each of the second curved parts 5b swells towards the tread edge E and is located on the outside of a straight line K drawn between the peak 6a and deepest point 7a.

In this example, the first curved part 5a and second curved part 5b face each other across the main groove 3.

Figure 4:
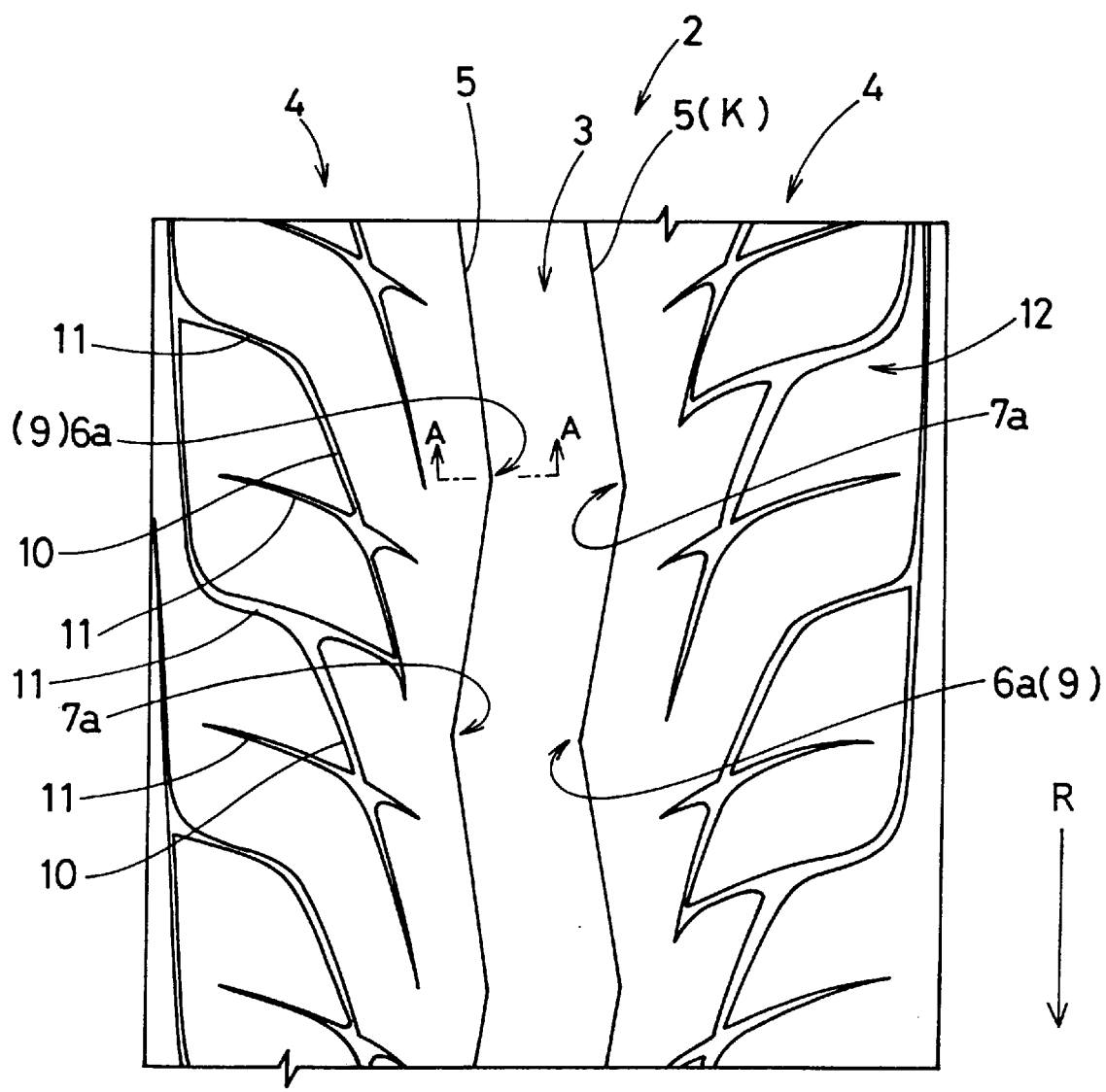
FIG. 4 is a plan view of another embodiment of the present invention.
Figure 5:
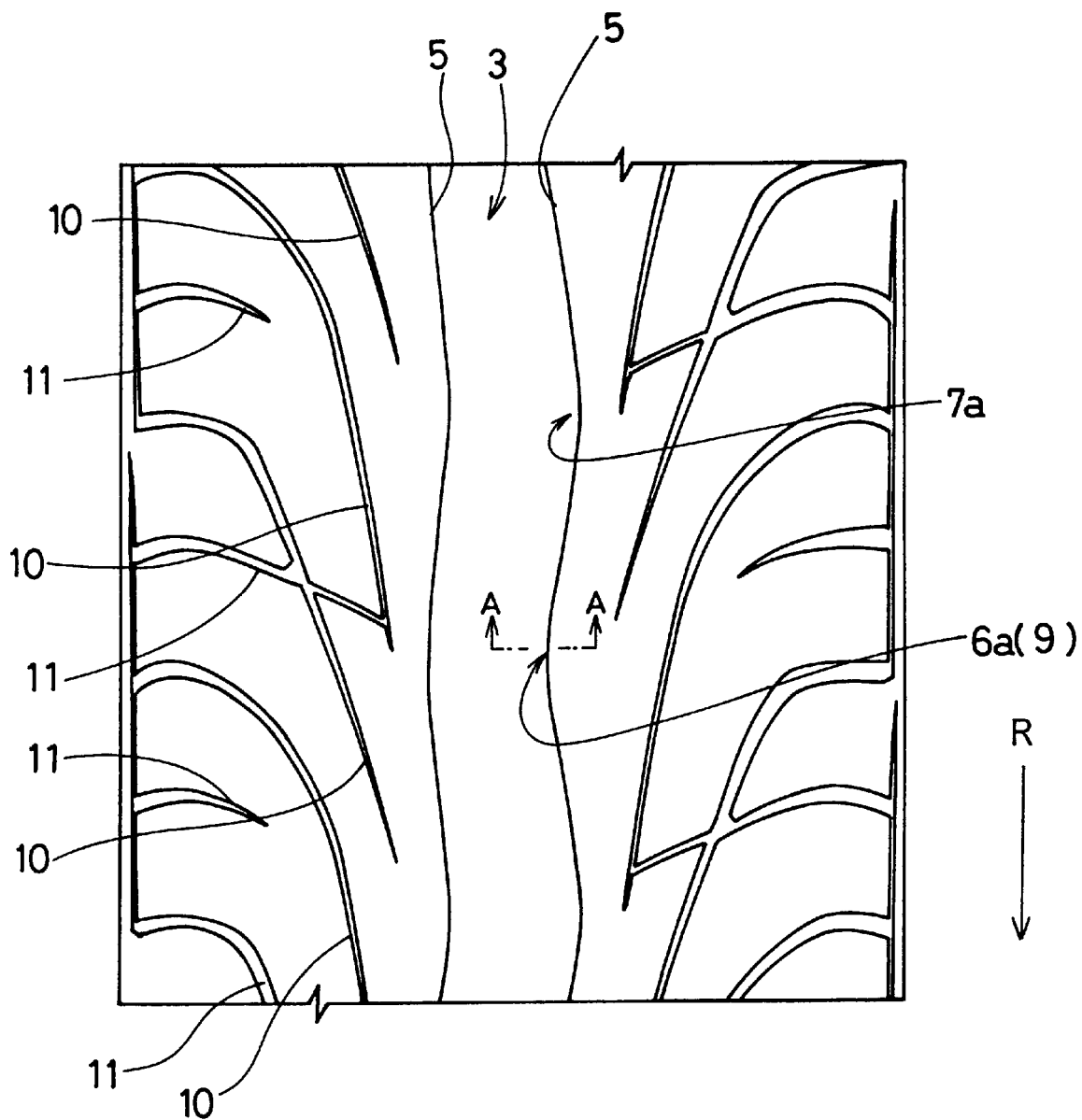
FIG. 5 is a plan view of still another embodiment of the present invention.

By the curved edges, wet grip performance can be further improved. However, it is also possible to form the groove edge 5 without using such a curved configuration as shown in FIG. 4. In this case, therefore, the edge 5 is defined by the zigzag line collectively formed by the straight lines K. Further, as shown in FIG. 5, it is also possible to change the zigzag amplitude between the two edges 5 so that one of them has a gentle zigzag.

The zigzag pitches lengths are preferably variable, but they can be a constant value.

The number of the zigzag pitches of each edge around the tire is set in the range of not less than 10, preferably not less than 14, more preferably not less than 15.

The tread portion 2 is provided on at least one side, in this embodiment both sides, of the main groove 3 with auxiliary grooves 10, 11, forming circumferentially-repeating design cycles.

Figure 3:
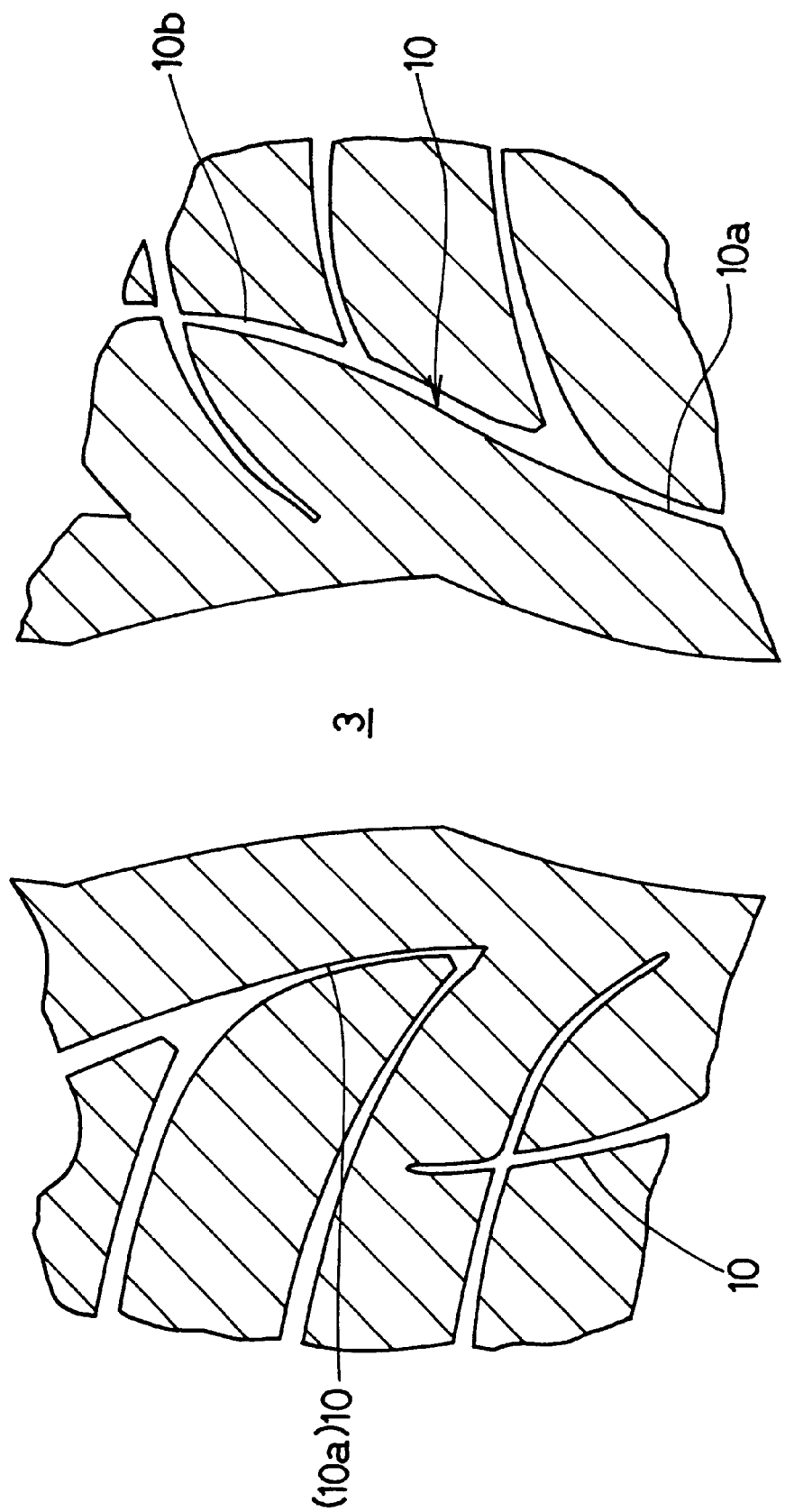
FIG. 3 shows a foot-print of the tire shown in FIG. 1.

The auxiliary grooves 10, 11 are not connected to the main groove 3. In other words, the auxiliary grooves 12 are terminated before the main groove 3 to form a circumferentially continuously extending rib-like annular part 14 on each side of the main groove 3. Thereby, the rigidity of the tread central region 2C is increased, and the steering stability can be improved. Further, the above-mentioned pitch noise is confined in the main groove to improve the overall noise such as pass-by noise. However, the auxiliary grooves 10, 11 are preferably extended to the tread edges E at least so as to open threat as shown in FIG. 3 which is a foot-print of the tire shown in FIG. 1.

The width of the auxiliary grooves 10, 11 is not less than 1.5 mm, and preferably not more than 5 mm so as not to decrease the tread rigidity. The groove width can be varied so as to gradually increase or decrease towards the groove end. The groove depth is preferably in the range of 2 to 8 mm.

The auxiliary grooves in each design cycle or design unit include a plurality of (preferably 2 to 6) lateral auxiliary grooves 11, and optionally at least of one longitudinal auxiliary groove 10 to be intersected by at least one of the lateral auxiliary grooves 11.

For example, the longitudinal auxiliary groove 10 may be defined as extending mainly in the tire circumferential direction at an inclining angle of not more than 45 degrees, more preferably not more than 35 degrees with respect to the tire circumferential direction, and both ends are terminated between the tread edge E and the main groove 3. The lateral auxiliary grooves 11 may be defined as extending mainly in the axial direction at an inclination angle of more than 45 degrees with respect to the tire circumferential direction, and one end is preferably opened at the tread edge E.

Preferably, the longitudinal auxiliary grooves 10 on each side of the main groove 3 are inclined to the same direction, which is however reverse to those on the other side. Further, the lateral auxiliary grooves 11 on each side of the main groove 3 are inclined to the same direction, which is however reverse to those on the other side.

In FIG. 1, the design unit comprises one longitudinal auxiliary groove 10 and four lateral auxiliary grooves 11.

Each longitudinal auxiliary groove 10 has a parallel part 10a being substantially parallel to the main groove 3 and a part 10b extending in the same fashion or in the substantially same direction as the parallel part 10a.

In this example, the parallel part 10a is parallel to the first curved part 5a, whereby the longitudinal auxiliary grooves 10 on one side of the main groove 3 are circumferentially shifted from those on the other side by one half of the zigzag pitch length PL which is defined between the peaks 6a.

The longitudinal auxiliary grooves 10 has preferably a circumferential length CL of more than the circumferential pitch length PL so that the ends are overlapped each other. In this example, the circumferential positions of the overlaps are adjusted to those of the peaks 6a, and the groove 10 extends slightly over the peak 6a on each end thereof.

The lateral auxiliary grooves 11 include four grooves 11a, 11b, 11c and 11d extending to the tread edge E at least so as to open thereat. The grooves 11a, 11b and 11c are extended, starting from the longitudinal auxiliary groove 10. However, the groove 11d is extended, starting from a positioned between the main groove 3 and the extended part 10b of the longitudinal auxiliary groove 10, across the extended part 10b so as to cut a relatively wide area of the annular part 14 formed between the main groove 3 and the extended part 10b. As a result, the rigidity of the annular part is evened in the circumferential direction, which helps to improve the pitch noise and wet grip performance. In this sense, it is preferable that the longitudinal auxiliary groove is extended into the above-mentioned relatively wide area of the annular part 14 beyond the peak 6a of protruding part.

The auxiliary grooves constituting the design unit can be variously changed. In FIG. 4, the design unit comprises two longitudinal auxiliary grooves 10 and four lateral auxiliary grooves 11. In FIG. 5, the design unit comprises two longitudinal auxiliary grooves 10 and two lateral auxiliary grooves 11.

The tread patterns shown in FIGS. 1, 4 and 5 are directional patterns, of which designed rotational direction is indicated by arrow R.

Test tires of size 245/40ZR18 were prepared, wherein the tread patterns were based on the tread pattern shown in FIG. 1 and the zigzag amplitude S, groove width GW and the like were changed as shown in Table 1. Using a Japanese 2600 cc-displacement 4WD passenger car provided on the four wheels with test tires, the following tests for wet grip performance, noise performance, and steering stability were conducted. The test results are shown in Table 1.

Wet grip performance Test Running the test car on a 100-meter radius asphalt road provided with a 20-meter-long 5-millimeter-depth water pool, the lateral acceleration was measured on the front wheel to obtain the average in a speed range of 50 to 80 km/h. The results are indicated in Table 1 by an index based on the conventional tire being 100, wherein the larger the value, the better the performance.

NOISE PERFORMANCE TESTS

1) Pass-by Noise Test According to a test procedure JASO-C606, the test car was coasted on a straight asphalt test course at a speed of 50 km/h for a distance of 50 meters, and the maximum Noise sound level in dB(A) was measured with a microphone fixed at a position 7.5 meter sideways from the center line of the course and 1.2 meter height from the road surface, wherein the smaller the value, the lower the pass-by Noise.

2) Pitch Noise Test The pitch noise or tread pattern noise was evaluated by the test driver's feeling.

Steering stability Test The test driver evaluated the steering response when a small steering angle of plus/minus 10 degrees was given to the steering wheel during running straight at a speed of 100 km/h on a dry asphalt road in a tire test course.

car. Low-frequency noise corresponding to the fundamental harmonic component of the noise when running over 50 km/h speed.

Middle-frequency noise corresponding to the fundamental and secondary harmonic components when running in a speed of range of 50 to 120 km/h. Hiddle-frequency noise ranging from 800 to 1200 Hz when running in a speed range of 70 to 120 km/h. Steering sound when a steering angle of 90 degrees was applied during running at a speed of 70 to 80 km/h. Breaking sound during braking the car from a speed of 60 km/h by –0.2G to –0.3G.

TABLE 2

Figure 6:
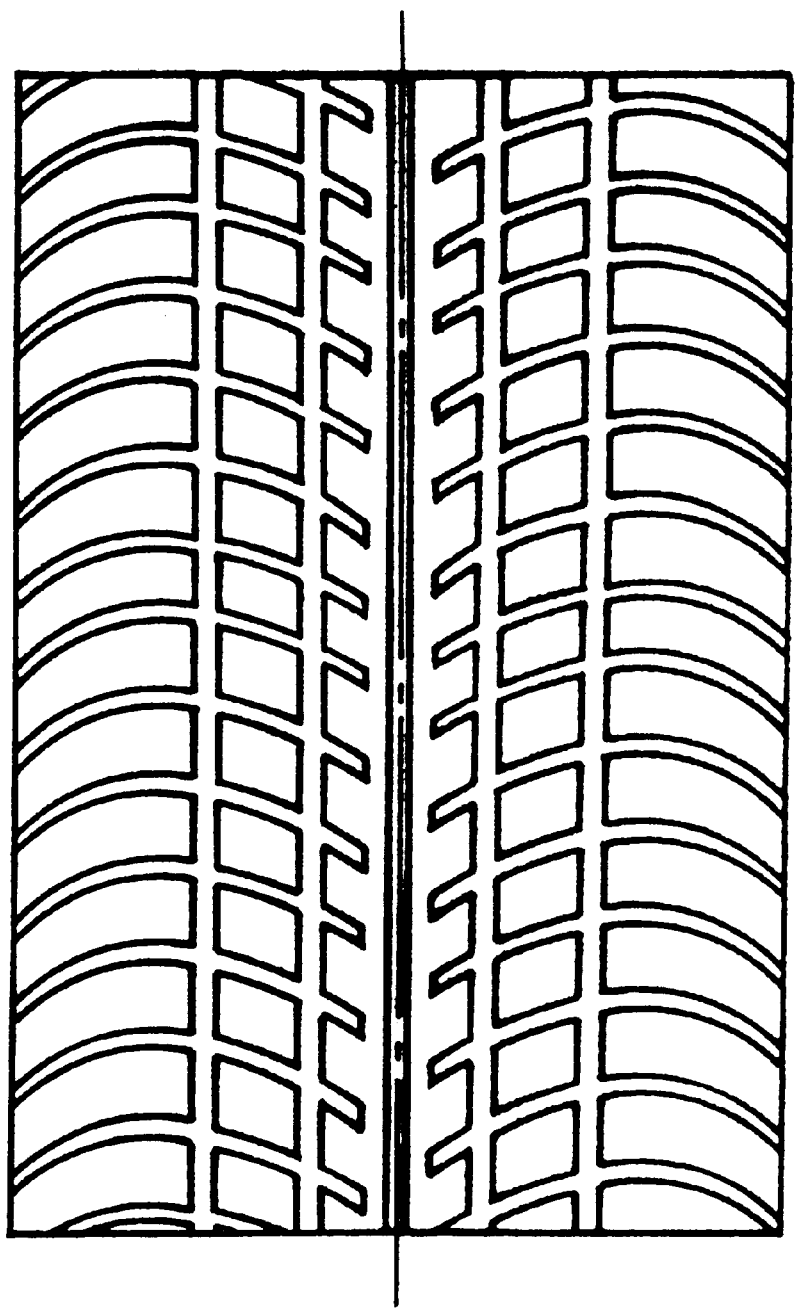
FIG. 6 is a plan view of Reference tire 8 used in comparison tests.

| Tire | Ex. 1 | Ex. 7 | Ex. 8 | Ref. 8 |
|---|---|---|---|---|
| Tread pattern | FIG. 1 | FIG. 4 | FIG. 5 | FIG. 6 |
| Low freq. | 3 to 3.1 | 2.7 to 2.7 | 2.8 | 3 |
| Middle freq. | 2.9 | 2.8 | 2.7 to 2.8 | 3 |
| High freq. | 3.1 | 3.1 | 3.1 | 3 |
| Steering | 2.9 | 2.9 | 2.9 | 3 |
| Braking | 3.1 | 3.1 | 3.1 | 3 |

What is claimed is:

1. A pneumatic tire comprising a tread portion,
   the tread portion provided in the center thereof with a zigzag main groove extending continuously in the tire circumferential direction to divide the tread portion into two lateral parts,
   each of said two lateral parts provided with no circumferential groove extending continuously in the tire circumferential direction,

TABLE 1

| Tire | Conv. | Ref. 1 | Ref. 2 | Ref. 3 | Ref/4 | Ref. 5 | Ref. 6 | Ref. 7 | Ex. 1 | Ex. 2 | Ex. 3 | Ex. 4 | Ex. 5 | Ex. 6 |
|---|---|---|---|---|---|---|---|---|---|---|---|---|---|---|
| Main groove | | | | | | | | | | | | | | |
| Groove width GW (mm) | 40 | 25 | 30 | 35 | 40 | 40 | 40 | 40 | 40 | 40 | 40 | 40 | 40 | 40 |
| Configuration | straight | zigzag | zigzag | zigzag | zigzag | zigzag | zigzag | zigzag | zigzag | zigzag | zigzag | zigzag | zigzag | zigzag |
| Zigzag amplitude S (mm) | 0 | 26 | 26 | 26 | 26 | 26 | 26 | 26 | 13 | 13 | 13 | 13 | 6 | 16 |
| S/GW | 0 | 1.04 | 0.87 | 0.74 | 0.65 | 0.65 | 0.65 | 0.65 | 0.33 | 0.33 | 0.33 | 0.33 | 0.15 | 0.4 |
| Intersecting groove *1 | 0 | 0 | 0 | 0 | 0 | 1 | 2 | 4 | 0 | 0 | 0 | 0 | 0 | 0 |
| Zigzag pitch number | — | 12 | 12 | 12 | 12 | 12 | 12 | 12 | 14 | 15 | 15 | 12 | 15 | 15 |
| Radius Ra (mm) | 0 | 0 | 0 | 0 | 0 | 0 | 0 | 0 | 5 | 5 | 7 | 5 | 3 | 12 |
| Test results | | | | | | | | | | | | | | |
| Wet grip | 100 | 42 | 50 | 75 | 100 | 105 | 107 | 109 | 102 | 102 | 103 | 102 | 101 | 103 |
| Pass-by noise dB (A) | 67.1 | 68.2 | 68.3 | 68 | 67.3 | 68.2 | 68.4 | 68.7 | 67.2 | 67.3 | 67 | 67.2 | 67.1 | 67.2 |
| Pitch noise *2 | A | C | D or C | D | D | D | D | D | B | B or A | A | B or A | A | B or A |
| Steering stability *3 | C | A | A | A or B | A or B | A or B | A or B | A or B | B | B | B | B | B | B |

*1 The number of lateral auxiliary grooves intersecting the main groove per four lateral auxiliary grooves which constitute a design unit.
*2 A: Excellent.
B: Good.
C: No good.
D: Bad
*3 A: Excellent steady stable response.
B: Steady stable response.
C: Slight response.
D: Almost no response It was confirmed that Example tires were improved in the noise performance and steering stability while maintaining the wet grip performance.

Table 2 shows the results of an additional test for the following various noises heard in the above-mentioned test the zigzag main groove having a groove width GW of not less than 35 mm,
the zigzag main groove having zigzag edges each having a zigzag amplitude S of not more than 0.4 times the groove width GW, the zigzag edges having protruding parts protruding towards the center line of the main groove and recessing parts alternating therewith, each said protruding part having a peak and each said recessing part having a deepest point, each of said protruding parts being rounded by an arc, and the radius of curvature of said arc being in the range of from 2 to 15 mm in a tire meridian section passing the peak of the protruding part, each said zigzag edge consisting of first segments and second segments which are alternated along the length of the main groove and each of which is defined between the adjacent peak and deepest point, the first segments curved axially inwards to be located on the axially inside of a straight line drawn between the peak and deepest point, the second segments curved axially outwards to be located on the axially outside of a straight line drawn between the peak and deepest point, and the first segments and second segments of one of the zigzag edges facing the second segments and first segments of the other zigzag edge, respectively.

2. The pneumatic tire according to claim 1, wherein each of zigzag segments of each said zigzag edge is substantially straight.

3. The pneumatic tire according to claim 2, wherein one of the lateral parts is provided with auxiliary grooves, the auxiliary grooves not intersecting the main groove to form a circumferentially continuously extending annular part between the main groove and the auxiliary grooves.

4. The pneumatic tire according to claim 2, wherein each of the lateral parts is provided with auxiliary grooves, the auxiliary grooves not intersecting the main groove to form a circumferentially continuously extending annular part on each side of the main groove.

5. The pneumatic tire according to claim 1, wherein one of the lateral parts is provided with auxiliary grooves, the auxiliary grooves not intersecting the main groove to form a circumferentially continuously extending annular part between the main groove and the auxiliary grooves.

6. The pneumatic tire according to claim 5, wherein said auxiliary grooves include lateral grooves and longitudinal grooves, each said longitudinal groove intersected by at least one of the lateral grooves.

7. The pneumatic tire according to claim 6, wherein the circumferential lengths of the longitudinal grooves are more than the circumferential lengths of the zigzag pitches defined between the peaks of the protruding parts, and the longitudinal grooves are circumferentially arranged at the substantially same pitches as the zigzag pitches so that the longitudinal grooves overlap each other.

8. The pneumatic tire according to claim 7, wherein the overlaps of the longitudinal grooves occur at the substantially same circumferential positions as the peaks of the protruding parts.

9. The pneumatic tire according to claim 1, wherein each of the lateral parts is provided with auxiliary grooves, the auxiliary grooves not intersecting the main groove to form a circumferentially continuously extending annular part on each side of the main groove.

10. The pneumatic tire according to claim 9, wherein said auxiliary grooves extend to the tread edges.

11. The pneumatic tire according to claim 10, wherein said auxiliary grooves include lateral grooves and longitudinal grooves, each said longitudinal groove intersected by at least one of the lateral grooves.

12. The pneumatic tire according to claim 9, wherein said auxiliary grooves include lateral grooves and longitudinal grooves, each said longitudinal groove intersected by at least one of the lateral grooves.

13. The pneumatic tire, according to claim 1 wherein:

the radius of curvature decreases towards a deepest point of each of an adjacent recessing part.

14. A pneumatic tire, comprising a tread portion, the tread portion provided in the center thereof with a zigzag main groove extending continuously in the tire circumferential direction to divide the tread portion into two lateral parts, each of said two lateral parts provided with no circumferential groove extending continuously in the tire circumferential direction, the zigzag main groove having a groove width GW of not less than 35 mm, the zigzag main groove having zigzag edges each having a zigzag amplitude S of not more than 0.4 times the groove width GW, the zigzag edges having protruding parts protruding towards the center line of the main groove and recessing parts alternating therewith, each said protruding part having a peak and each said recessing part having a deepest point, each of said protruding parts rounded by an arc, and the radius of curvature of said arc being in the range of from 2 to 15 mm in a tire meridian section passing the peak of the protruding part, each said zigzag edge consisting of first segments and second segments which are alternated along the length of the main groove and each of which is defined between the adjacent peak and deepest point, the first segments curved axially inwards to be located on the axially inside of a straight line drawn between the peak and deepest point, the second segments curved axially outwards to be located on the axially outside of a straight line drawn between the peak and deepest point, and the first segments and second segments of one of the zigzag edges facing the second segments and first segments of the other zigzag edge, respectively, wherein one of the lateral parts is provided with auxiliary grooves, the auxiliary grooves not intersecting the main groove to form a circumferential continuously extending annular part between the main groove and the auxiliary grooves, said auxiliary grooves include lateral grooves and longitudinal grooves, each said longitudinal groove intersected by at least one of the lateral grooves, each said longitudinal grooves comprises a parallel part being substantially parallel to one of zigzag segments of the main groove, and a remaining part extending in the substantially same direction as the parallel part, and the remaining part is crossed by one of the lateral grooves.

15. The pneumatic tire according to claim 14, wherein the parallel part is substantially parallel to one of axially inwardly curved segments of the zigzag edges.

16. A pneumatic tire, comprising:

a tread portion provided in the center thereof with a zigzag main groove extending continuously in the tire circumferential direction to divide the tread portion into two lateral parts, each of the lateral parts provided with no circumferential groove extending continuously in the tire circumferential direction, the zigzag main groove having a groove width GW of not less than 35 mm, the zigzag main groove having zigzag edges each having a zigzag amplitude S of not more than 0.4 times the groove width GW, the zigzag edges having parts protruding towards the center line of the main groove and rounded by an arc, the radius of curvature of said arc being in the range of from 2 to 15 mm in a tire meridian section passing a peak of the protruding part, one of the lateral parts provided with auxiliary grooves not intersecting the main groove to form a circumferentially continuously extending annular part between the main groove and the auxiliary grooves, said auxiliary grooves include lateral grooves and longitudinal grooves, each said longitudinal groove, comprising:

a parallel part being substantially parallel to one of axially inwardly curved segments of the zigzag edges of the main groove, and a remaining part extending in the substantially same direction as the parallel part, and crossed by one of the lateral grooves.

* * * * *